Patented Nov. 25, 1941

2,263,597

UNITED STATES PATENT OFFICE 2,263,597

DERIVATIVES OF 4-(4'-NITRO-2'-SULPHO PHENYL AMINO) AMINO BENZENES AND PROCESSES OF MAKING THE SAME

Chiles E. Sparks, Wilmington, Del., assignor to E. I. du Pont de Nemours & Company, Wilmington, Del., a corporation of Delaware No Drawing. Application October 2, 1940, Serial No. 359,346

6 Claims. (Cl. 260—506)

This invention relates to new organic compounds, and especially to a class of acyl derivatives of a series of 4-(4'-nitro-2'-sulpho phenyl amino)-1 and -2)-amino benzenes and their reduction products, and to processes of making the same.

The new compounds may be made in general by condensing a 4-(4'-nitro-2'-sulpho phenyl amino)-1- or 2-amino-benzene with an acid halide, such as carbonyl chloride and the acid halides which are represented by the formulae

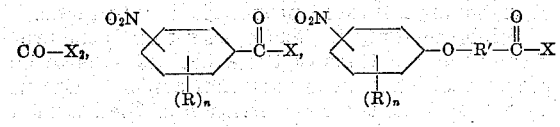

and

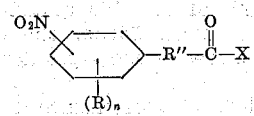

wherein the nitro groups are in meta or para positions with respect to the carbonyl group, R is from a group consisting of hydrogen, alkyl having 1 to 6 carbons, the corresponding alkoxy groups, chloro and bromo; R' is a saturated aliphatic hydrocarbon radical having 1 to 6 carbon atoms which may be either straight or branched chain; R'' is a saturated or unsaturated aliphatic hydrocarbon radical having 1 to 6 carbons which may be either straight or branched chain; $n$ is an integer not greater than 2; and X is chlorine or bromine. The acid halide is condensed with a compound of the 4-(4'-nitro-2'-sulpho phenyl amino)-1 or 2-amino-benzene series represented by the formula

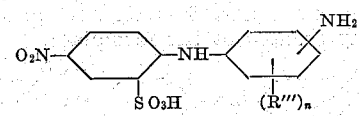

wherein R''' is from a group consisting of hydrogen, halogen, alkyl having 1 to 6 carbons, the corresponding alkoxy groups, carboxyl and sulphonic acid.

The new compounds are represented generally by the formula

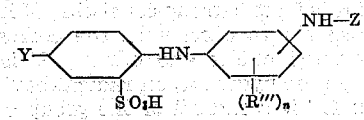

wherein Y is nitro or amino and Z is an acyl radical of a group represented by the formulae

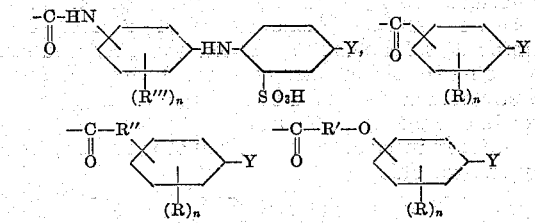

The invention will be more fully set forth in the following more detailed description which includes examples that are given as illustrative embodiments of the invention and not as limitations thereof. Parts are expressed in parts by weight unless otherwise noted.

Example I

A solution was made by dissolving 97 parts of 4-amino-4'-nitro-diphenylamine-2'-sulphonic acid in 300 parts of water containing 16.6 parts of sodium carbonate, or enough sodium carbonate to make the solution slightly alkaline to Brilliant Yellow papers. The solution was heated to 55° C. and while maintaining good agitation, a solution containing 61.4 parts of para-nitro-benzoyl-chloride as a 20% solution in carbon tetra-chloride was slowly added over a period of 1.5 hours. During this period and for one hour subsequent to the final addition of the acid chloride, the temperature was maintained at 55°–60° C. and the pH was maintained just on the alkaline side of neutral to Brilliant Yellow papers.

Soda ash was then added until the reaction mass was distinctly alkaline to Brilliant Yellow papers. After stirring for ten minutes, the mixture was cooled to 20° C. and the precipitated product was filtered off and washed with 100 parts of water.

The product is represented by the formula

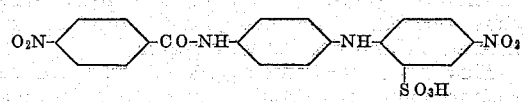

A slurry containing 126 parts of iron powder, 500 parts of water and 7.5 parts of acetic acid was heated to 90° C. and while agitating vigorously, the press cake obtained in the foregoing procedure was slowly added over a period of three hours. The temperature was held at 85°–95° C. and an excess of soluble iron was present at all times as shown by a heavy black rim when the reduction solution was spotted on filter paper with sodium sulphide solution. After all of the nitro body had been added the mixture was agitated at 85°–95° C. for three hours. Then soda ash was added until a definite alkalinity on Brilliant Yellow papers resulted. The solution was clarified by adding three parts of Darco and filtering while hot. The filtrate was cooled to 20° C. and the product was precipitated by adding sulphuric acid until the mixture was faintly acid to Congo Red paper. After filtering the press cake was washed with cold water and then dried in an air dryer at 50° C. This product was 4-(4''-amino-benzoyl-amino)-4'-amino-diphenylamine-2'-sulphonic acid and it had a purity of about 88.6% as determined from nitrite value.

*Example II*

4-(4''-nitro-phenoxy-acetyl-amino)-4'-nitro-2'-sulpho-diphenylamine was prepared by the method described in Example I except that 71.4 parts of 4-nitro-phenoxy-acetyl-chloride were used instead of 61.4 parts of para-nitro-benzoyl-chloride. This product had a purity of 74.7%.

4-(4''-amino-phenoxy-acetyl-amino)-4'-amino-2'-sulpho-diphenylamine was prepared by reducing the latter nitro compound with iron and acetic acid as described in Example I. The product had a purity of 84.9%.

In its reduced form this product is represented by the formula

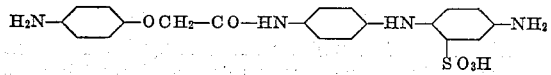

By using an equivalent amount of any of the acid halides heretofore indicated instead of 71.4 parts of 4-nitro-phenoxy-acetyl chloride in the foregoing process, other products with the corresponding amino phenoxy acylamino groups were produced.

*Example III*

A solution was made by dissolving 97 parts of 4-amino-4'-nitro-diphenylamine-2'-sulphonic acid in 300 parts of water containing 16.6 parts of sodium carbonate or enough sodium carbonate to make the solution slightly alkaline to Brilliant Yellow.

Phosgene was passed into this solution and the solution was kept alkaline to Brilliant Yellow by the addition of small amounts of soda ash as required. The temperature was held at 20–30° C. during the phosgenation and phosgene was passed in the solution until the primary amine was no longer present as shown by acidifying a sample of the mixture with hydrochloric acid and testing with a drop of sodium nitrite solution. Primary amine is present if this solution gives a deep color when spotted on filter paper with an alkaline solution of an azo dye coupling component such as phenyl-J acid. The solution was acidified with hydrochloric acid to precipitate the N,N'-di[4-(4'-nitro-2'-sulpho-phenyl-amino)-phenyl]-urea thus formed. The precipitated product was filtered off and washed with water.

This nitro-substituted product was reduced with iron and acetic acid by the method described in Example I. The N,N'-di[4-(4'-amino-2'-sulpho-phenyl-amino)-phenyl]-urea prepared in this manner had a purity of 94.5%, as calculated from the nitrite value.

As illustrations of the many other nitro-acid halides which may be used instead of the nitro-acid halides set forth in the foregoing examples to produce other modifications of the invention are mentioned 4-nitro-phenyl-propionyl chloride, 4-nitro-phenyl-acetyl-chloride, 3-nitro-benzoyl chloride, 3-nitro-anisoyl chloride, 3-nitro-phenoxy-acetyl chloride, alpha (2-nitro-4-methyl-phenoxy)-propionyl chloride, beta (4-nitro-phenoxy)-butyryl chloride, 4-nitro-benzoyl bromide, 4-nitro-phenoxy-acetyl-bromide, 2-nitro-phenoxy-acetyl chloride, 3-nitro-4-propoxy-benzoyl chloride, 2,4-dichloro-6-nitro-phenoxy-acetyl chloride, 3-nitro-4-chloro-benzoyl chloride, epsilon (4-nitro-phenoxy)-hexanoyl chloride, 3-nitro-cinnamoyl chloride and 4-nitro-cinnamoyl bromide.

As illustrations of other nitro-amino-diphenylamine-sulphonic acids which can be used to produce other modifications of the invention when used in the described processes instead of 4-amino-4'-nitro-diphenylamine-2'-sulphonic acid are mentioned 3-amino-4'-nitro-2'-sulpho-diphenylamine, 3-amino-4-methyl-2'-sulpho-4'-nitro-diphenylamine, 4-amino-2,5-dimethoxy-2'-sulpho-4'-nitro-diphenylamine, 3-amino-5-carboxy-2'-sulpho-4'-nitro-diphenylamine, 4-amino-2-methyl-5-methoxy-2'-sulpho-4'-nitro-diphenylamine and 2-chloro-4-amino-2'-sulpho-4'-nitro-diphenylamine.

The new compounds are producible in good yield and purity by the methods of the invention and they are useful as intermediates for making other various compounds such as longer chain amino derivatves, diazo compounds and the like. The diamines are especially useful as tetrazo bases for manufacturing azo dyes whereby new dyes having improved properties may be made.

While the foregoing examples set forth the preferred modifications of the processes, it is to be understood that some variation can be made in details such as the concentration of the reaction media, temperatures, alkali and acid concentrations, the kind of metallic reducing agent and drying temperature. Either the chloro or the bromo acid halides of the types described can be used.

From the foregoing disclosure it will be recognized that the invention is susceptible of modification without departing from the spirit and scope thereof and it is to be understood that the invention is not restricted to the specific illustrations thereof herein set forth.

I claim:

1. A compound represented by the formula

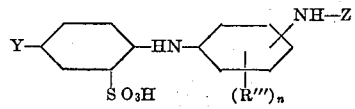

wherein Y is one of a group consisting of nitro and amino; R''' is from a group consisting of hydrogen, halogen, alkyl having 1 to 6 carbons, the corresponding alkoxy groups, carboxyl and sulphonic acid; and Z is an acyl radical of a group represented by the formulae

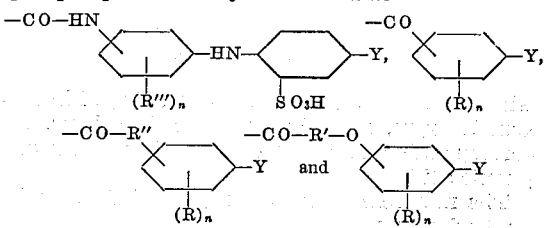

wherein R is from a group consisting of hydrogen, alkyl having 1 to 6 carbons, the corresponding alkoxy groups, chloro and bromo; R' is a saturated aliphatic hydrocarbon radical having 1 to 6 carbons; R'' is a radical of the group consisting of saturated and unsaturated aliphatic hydrocarbon radicals having 1 to 6 carbons; and $n$ is an integer not greater than 2.

2. 4-(4''-amino-benzoyl-amino)-4'-aminodiphenylamine-2'-sulphonic acid.

3. 4-(4''-amino-phenoxy-acetyl-amino)-4'-amino-diphenylamine-2'-sulphonic acid.

4. N,N'-di[4-(4'-amino-2'-sulpho-phenyl-amino)-phenyl]-urea.

5. The process which comprises adding an acid halide of a class consisting of the compounds represented by the formulae $COX_2$,

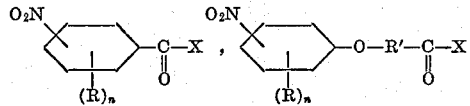

and

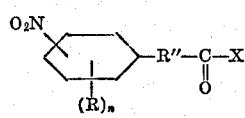

to an alkaline aqueous solution of a compound represented by the formula

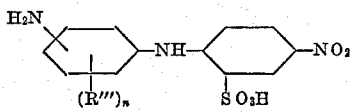

wherein X is one of a group consisting of chlorine and bromine; R is from a group consisting of hydrogen, alkyl having 1 to 6 carbons, the corresponding alkoxy groups, chloro and bromo; R' is a saturated aliphatic hydrocarbon radical having 1 to 6 carbons; R'' is from a group consisting of saturated and unsaturated hydrocarbon radicals having 1 to 6 carbons; R''' is from a group consisting of hydrogen, halogen, alkyl having 1 to 6 carbons, the corresponding alkoxy groups, carboxyl and sulphonic acid; and $n$ is an integer not greater than 2; and heating at condensation temperatures until condensation has taken place; said reaction mixture being slightly alkaline.

6. The process which comprises adding an acid halide of a class consisting of the compounds represented by the formulae $COX_2$,

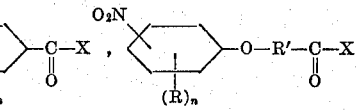

and

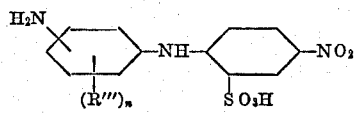

to an alkaline aqueous solution of a compound represented by the formula

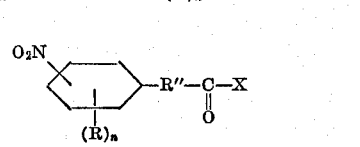

wherein X is one of a group consisting of chlorine and bromine; R is from a group consisting of hydrogen, alkyl having 1 to 6 carbons, the corresponding alkoxy groups, chloro and bromo; R' is a saturated aliphatic hydrocarbon radical having 1 to 6 carbons; R'' is from a group consisting of saturated and unsaturated hydrocarbon radicals having 1 to 6 carbons; R''' is from a group consisting of hydrogen, halogen, alkyl having 1 to 6 carbons, the corresponding alkoxy groups, carboxyl and sulphonic acid; and $n$ is an integer not greater than 2; and heating at condensation temperatures until condensation has taken place; said reaction mixture being slightly alkaline; and then reducing the nitro groups.

CHILES E. SPARKS.